US012756410B2

(12) United States Patent
Lomen

(10) Patent No.: US 12,756,410 B2
(45) Date of Patent: Oct. 6, 2026

(54) SYSTEMS, DEVICES, AND METHODS UTILIZING A WIDEBAND BANDSTOP FILTER

(71) Applicant: The MITRE Corporation, McLean, VA (US)

(72) Inventor: Brandt James Lomen, Bedford, NH (US)

(73) Assignee: The MITRE Corporation, McLean, VA (US)

( * ) Notice: Subject to any disclaimer, the term of this patent is extended or adjusted under 35 U.S.C. 154(b) by 212 days.

(21) Appl. No.: 18/810,824

(22) Filed: Aug. 21, 2024

(65) Prior Publication Data

US 2026/0058681 A1 Feb. 26, 2026

(51) Int. Cl.
*H04B 1/10* (2006.01)

(52) U.S. Cl.
CPC ... *H04B 1/1027* (2013.01); *H04B 2001/1045* (2013.01); *H04B 2001/1072* (2013.01)

(58) Field of Classification Search
CPC ................ H04B 1/1027; H04B 1/1036; H04B 2001/1045; H04B 2001/1072
See application file for complete search history.

(56) References Cited

U.S. PATENT DOCUMENTS

| | | | | |
|---|---|---|---|---|
| 5,877,447 | A | 3/1999 | Vice | |
| 6,539,202 | B1 | 3/2003 | Yamashita | |
| 6,724,840 | B1 | 4/2004 | Osofsky | |
| 6,792,250 | B1 | 9/2004 | Zarubin | |
| 7,664,455 | B2 | 2/2010 | So | |
| 8,521,090 | B2 | 8/2013 | Kim | |
| 8,981,873 | B2 | 3/2015 | Zhang | |
| 9,425,840 | B2 | 8/2016 | Kintis | |
| 9,444,504 | B1 * | 9/2016 | Robinson | H03M 1/12 |
| 9,654,983 | B2 | 5/2017 | Floyd | |
| 2001/0050987 | A1 * | 12/2001 | Yeap | G10L 21/0208 379/399.01 |

(Continued)

FOREIGN PATENT DOCUMENTS

| | | | |
|---|---|---|---|
| CN | 111654260 | A | 9/2020 |
| KR | 10-0298342 | B1 | 8/2001 |

OTHER PUBLICATIONS

Chan et al. (2003). "High-Resolution Photonics-Based Interference Suppression Filter With Wide Passband," Journal of Lightwave Technology 21(12): 3144-3149.

(Continued)

*Primary Examiner* — Nguyen T Vo
(74) *Attorney, Agent, or Firm* — Morrison & Foerster LLP

(57) ABSTRACT

Systems and methods for attenuating one or more unwanted frequency components are disclosed. The system may be configured to receive signals having different frequency components, but the signals may comprise one or more unwanted frequency components. The bandstop filter may be tuned to selectively attenuate the one or more unwanted frequency components while allowing the system to receive other frequency components that are not attenuated. In some embodiments, the bandstop filter comprises a bandpass filter, a delay element, and an amplitude adjustor. The bandstop filter may be tuned by adjusting one or more filter parameters of these components.

20 Claims, 9 Drawing Sheets

(56) References Cited

U.S. PATENT DOCUMENTS

| | | | | |
|---|---|---|---|---|
| 2005/0085939 | A1* | 4/2005 | Nakazato | G05B 19/404 700/173 |
| 2011/0065408 | A1 | 3/2011 | Kenington | |
| 2011/0065409 | A1 | 3/2011 | Kenington | |

OTHER PUBLICATIONS

Lababidi et al. "Miniaturized Passive Two-Path Notch Filter For UWB receiver," The 13th Mediterranean Microwave Symposium (MMS), Sep. 2, 2013, France; pp. 1-5.

* cited by examiner

SYSTEMS, DEVICES, AND METHODS UTILIZING A WIDEBAND BANDSTOP FILTER

TECHNICAL FIELD

This disclosure generally relates to bandstop filters. More particularly, this disclosure relates to tunable bandstop filters.

BACKGROUND

Some communication systems are configured to transmit a unique signal and receive it securely using a wideband receiver. In some cases, there are non-cooperative signals present, which the receiver must be able to dynamically reject. Failure to sufficiently filter these signals may result in the degradation of the receiver's performance or render the receiver inoperable. To cancel out unwanted signals, receivers may be equipped with a bandstop filter.

In some cases, it may be desirable for the receiving system to reject only a narrow band of frequencies, for example, when the unwanted frequencies are close to the receiving frequencies. In these cases, it would be desirable for the bandstop filter to achieve strong attenuation at frequencies within the stopband, with a steeper drop off in filter loss outside of the stopband. It may also be desirable to tune the frequency of the stopband, to adapt to different unwanted frequencies.

Existing bandstop filter systems may not be capable of controlled and effective signal rejection. For example, the Chebyshev filter requires complex procedures in order to tune the stopband and may not respond fast enough to change in unwanted frequencies. Other systems which rely on direct signal cancelation may produce harmonic nulls and may fail to filter out a sufficiently narrow range of frequencies.

SUMMARY

This disclosure relates to systems comprising a bandstop filter. The system may be configured to receive signals having different frequency components, but the signals may comprise one or more unwanted frequency components. The bandstop filter may be tuned to selectively attenuate the one or more unwanted frequency components while allowing the system to receive other frequency components that are not attenuated. In some embodiments, the bandstop filter comprises a bandpass filter, a delay element, and an amplitude adjustor. The bandstop filter may be tuned by adjusting one or more filter parameters of these components.

Advantageously, the disclosed systems and bandstop filters can attenuate different unwanted frequency components, allowing the system more flexibility to reject different frequencies. The systems and bandstop filters described herein may be tuned faster than existing filter systems, preventing varying unwanted frequency components from interfering with system operations. The systems and bandstop filters described herein also allow more precise and greater attenuation of an unwanted frequency component. Further, the systems and bandstop filters described herein may eliminate harmonic nulls that attenuate frequency components other than unwanted ones, which is undesirable.

In some embodiments, a system comprises a receiver configured to receive a signal comprising an unwanted frequency component, a tunable bandstop filter configured to attenuate an unwanted frequency component of an input signal to the tunable bandstop filter, the tunable bandstop filter comprising: a bandpass filter configured to output a bandpass signal by: attenuating frequencies of a signal input to the bandpass filter below a first frequency threshold, and attenuating frequencies of the signal input to the bandpass filter above a second frequency threshold, a delay element, and an amplitude adjustor, and one or more processors configured to attenuate the unwanted frequency component of the received signal by: determining, based on a delay of the bandpass filter and a frequency of the unwanted frequency component, delay to add by the delay element; causing the delay element to add the delay to a signal input to the delay element to generate a delayed signal; determining, based on an amplitude of the bandpass signal at the frequency of the unwanted frequency component, an amplitude adjustment; and causing the amplitude adjustor to modify, by the amplitude adjustment, the amplitude of a signal input to the amplitude adjustor at the frequency of the unwanted frequency component to generate an amplitude-adjusted signal, where the unwanted frequency component of the received signal is attenuated based on the bandpass signal, the delayed signal, and the amplitude-adjusted signal.

In some embodiments, the delay element comprises a phase shifter.

In some embodiments, the delay to add is determined based on a 180-degree phase shift at the frequency of the unwanted frequency component.

In some embodiments, the delay to add comprises the 180-degree phase shift and the delay of the bandpass filter.

In some embodiments, the one or more processors are configured to determine a loss of the bandpass filter, and the amplitude adjustment is determined further based on the loss of the bandpass filter.

In some embodiments, the amplitude adjustor comprises an attenuator.

In some embodiments, the one or more processors are configured to determine the frequency of the unwanted frequency component.

In some embodiments, in accordance with the determined frequency, the one or more processors are configured to determine the first frequency threshold; and determine the second frequency threshold.

In some embodiments, the delay to add is determined based on the determined frequency.

In some embodiments, the system further comprises a second received operating at the frequency of the unwanted frequency component, and the frequency of the unwanted frequency component is determined based on the second receiver.

In some embodiments, the system further comprises a transmitted configured to transmit a second signal, and the second signal comprises the first signal comprising the unwanted frequency component.

In some embodiments, the tunable bandstop filter is configured to attenuate a second unwanted frequency component, the second frequency is attenuated based on a second bandpass signal, a second delayed signal, and a second amplitude-adjusted signal.

In some embodiments, the one or more processors are configured to determine a level of the attenuation of the unwanted frequency component, and one or more of the delay to add and the amplitude adjustment are determined further based on the level of the attenuation.

In some embodiments, the delay element comprises a programmable delay element.

In some embodiments, the bandpass filter comprises a programmable bandpass filter.

In some embodiments, the attenuating the unwanted frequency component based on the bandpass signal, the delayed signal, and the amplitude-adjusted signal comprises: generating a delayed amplitude-adjusted signal based on the delayed signal and the amplitude-adjusted signal; and combining the bandpass signal and the delayed amplitude-adjusted signal.

In some embodiments, a frequency of the received signal is 2-18 GHz.

In some embodiments, a method for attenuating an unwanted frequency component comprises receiving a signal comprising the unwanted frequency component; outputting a bandpass signal by: attenuating frequencies of a first signal to the bandpass filter below a first frequency threshold, and attenuating frequencies of the first signal to the bandpass filter above a second frequency threshold; determining, based on a delay associated with the outputting of the bandpass signal and a frequency of the unwanted frequency component, a delay to add to a second signal; adding the delay to the second signal to generate a delayed signal; determining, based on an amplitude of the bandpass signal at the frequency of the unwanted frequency component, an amplitude adjustment; modifying, by the amplitude adjustment, the amplitude of a third signal to generate an amplitude-adjusted signal; and attenuating the frequency of the unwanted frequency component based on the bandpass signal, delayed signal, and amplitude-adjusted signal.

In some embodiments, the method further comprises determining the frequency of the unwanted frequency component.

In some embodiments, one or more of the first frequency threshold, the second frequency threshold, the delay to add, and the amplitude adjustment are determined based on the determined frequency of the unwanted frequency component.

In some embodiments, the method comprises one or more steps described with respect to the above system.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

This disclosure relates to systems comprising a receiver and a bandstop filter. In an exemplary embodiment, the receiver is configured to receive signals having different frequency components, but the signals may also comprise one or more unwanted frequency components. The bandstop filter may be a tunable bandstop filter. The bandstop filter may be tuned to selectively attenuate the one or more unwanted frequency components while allowing the receiver to receive other frequency components that are not attenuated.

In some embodiments, the system comprises one or more processors and/or circuitry configured to adjust parameters of the bandstop filter to tune the one or more frequency components being attenuated. In some embodiments, the bandstop filter comprises a bandpass filter, a delay element, and an amplitude adjustor. The bandstop filter may be tuned by adjusting one or more filter parameters of these components.

Advantageously, the systems and bandstop filters described herein can attenuate different unwanted frequency components, allowing the system more flexibility to reject different frequencies. The systems and bandstop filters described herein may be tuned faster than existing filter systems, preventing varying unwanted frequency components from interfering with system operations. The systems and bandstop filters described herein also allow more precise and greater attenuation of an unwanted frequency component. Further, the systems and bandstop filters described herein may eliminate harmonic nulls that attenuate frequency components other than unwanted ones, which is undesirable.

FIGS. 1A-1D illustrate exemplary systems in which a bandstop filter is used in conjunction with one or more receivers to selectively attenuate one or more unwanted frequencies of a signal. In some embodiments, the bandstop filter is used to filter an incoming signal before it is received by a receiver. In some embodiments, the system further comprises one or more transmitters which transmit outgoing signals. In some embodiments, the one or more receivers and one or more transmitters are integrated into one device. In some embodiments, the one or more receivers and the one or more transmitters are different devices coupled together.

It should be appreciated that the systems described with respect to FIGS. 1A-1D are exemplary, and that the receivers, the transmitters, and one or more bandstop filters may be arranged, coupled, and/or configured differently than described. For example, the systems may comprise more than one bandstop filters to attenuate more than one unwanted frequency components.

Figure 1A:
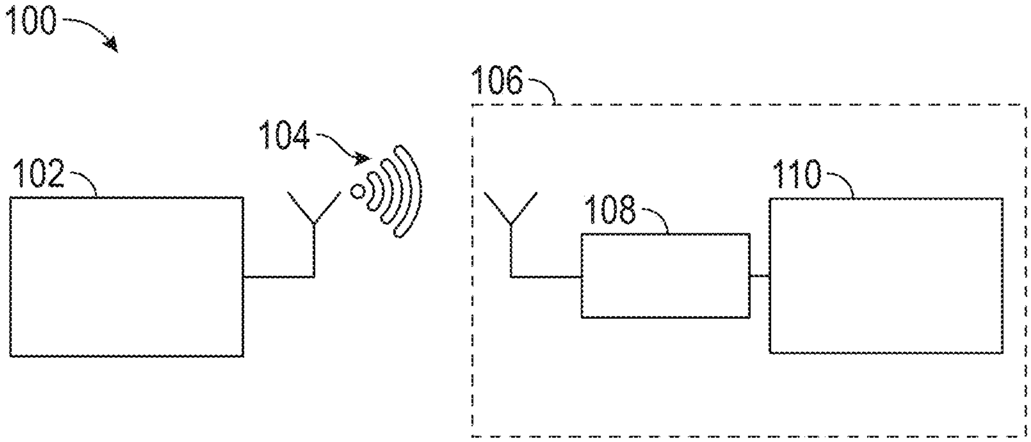
FIGS. 1A-1D illustrate exemplary systems comprising a bandstop filter and one or more receivers, according to embodiments of this disclosure.

FIG. 1A illustrates an exemplary environment 100 in which a transmitter 102 transmits a signal received by an exemplary system 106. In some embodiments, the transmitter 102 comprises a transmitter of a non-cooperative signal (e.g., interfering signal 104). In some embodiments, the signal received by system 106 is an interfering signal 104, which comprises frequency components that may degrade system performance.

In some embodiments, the system 106 comprises a tunable bandstop filter 108 coupled to a receiver 110. The tunable bandstop filter 108 is described in more detail herein, for example, with respect to FIG. 2. The receiver may comprise a receiving antenna and circuitry for receiving and processing a received signal. For example, receiver 110 is a radio. As illustrated, the incoming signal 104 passes through the tunable bandstop filter 108 before it arrives at the receiver 110. Advantageously, the bandstop filter 108 may attenuate the interfering signal 104, which comprises one or more unwanted frequency components, before it reaches the receiver 110.

In some embodiments, the interfering signal comprises one unwanted frequency component. The bandstop filter 108 may be tuned to attenuate the unwanted frequency component. Advantageously, the bandstop filter may be tuned to attenuate unwanted frequency in different contexts. For instance, at a first time, the system 106 is configured for operation at a first frequency. At the first time, the bandstop filter is tuned to attenuate a first unwanted frequency component. At a second time, the system 106 is configured for operation at a second frequency, different from the first frequency. At the second time, the bandstop filter is tuned to attenuate a second unwanted frequency component, different from the first unwanted frequency component.

The system 106 may also be configured to determine the unwanted frequency component of the incoming signal 104 and tune the bandstop filter to attenuate the determined unwanted frequency component. For instance, the system 106 may determine the unwanted frequency component by assessing system performance. As another example, the system 106 may determine the unwanted frequency component based a spectral analysis of incoming signals. If the interfering signal is not sufficiently attenuated by the bandstop filter, it may degrade the performance of the receiver 110 and the system 106 or render them inoperable. Failure to reject the interfering signal may compromise sensitivity of a receiving system. For instance, a higher-power signal (e.g., TV station transmission) may prevent a lower-power signal (e.g., a small radio signal) from being detected, unless the higher-power signal is attenuated.

As explained in more detail herein, the bandstop filter can attenuate different unwanted frequency components, allowing the system more flexibility to reject different frequencies. The bandstop filter may be tuned faster than existing filter systems, preventing varying unwanted frequency components from interfering with system operations. The bandstop filter also allow more precise and greater attenuation of an unwanted frequency component. Further, the bandstop filter may eliminate harmonic nulls that attenuate frequency components other than unwanted ones, which is undesirable.

In some embodiments, the system 106 comprises one or more processors and/or circuitry (not shown) configured to perform the operations described herein (e.g., adjust parameters of the bandstop filter to tune the frequency components being attenuated, determine the parameters, determine unwanted frequency components).

Figure 1B:
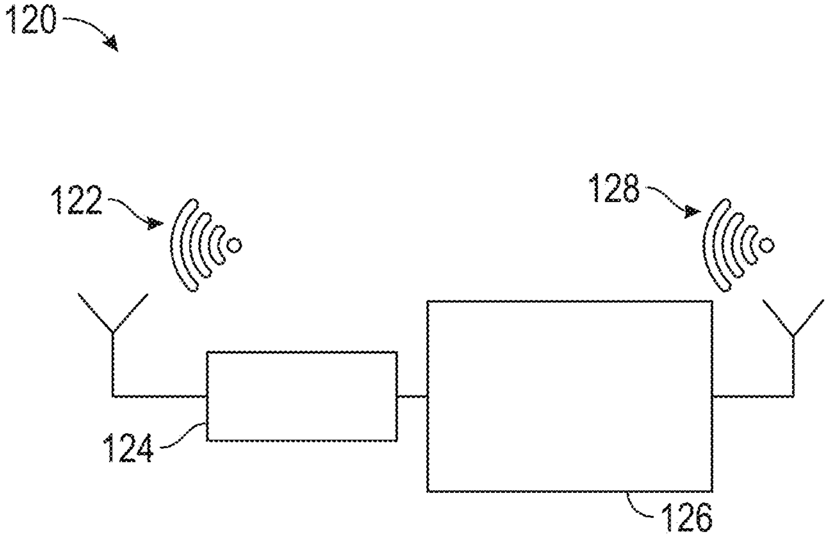
Figure 1C:
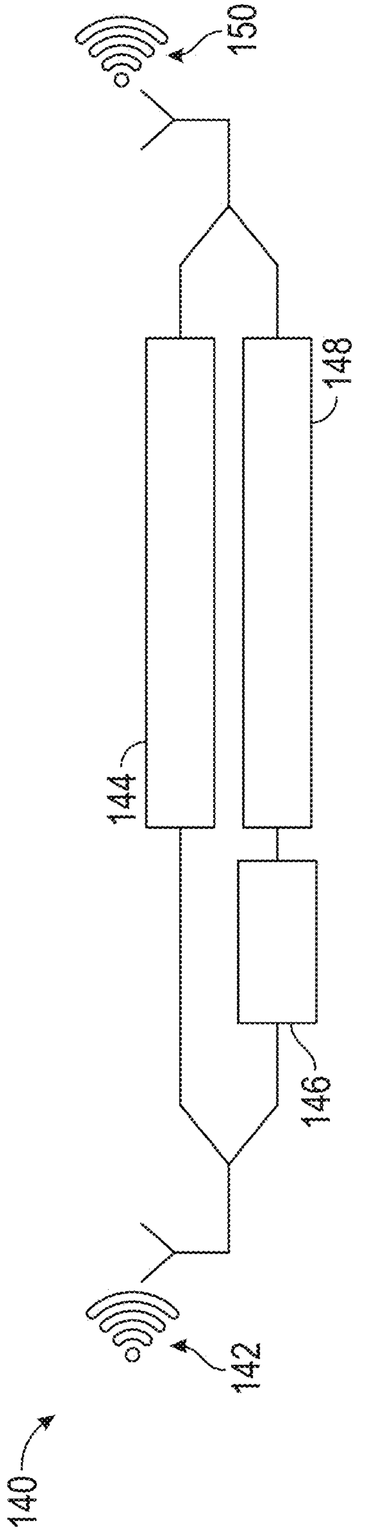
Figure 1D:
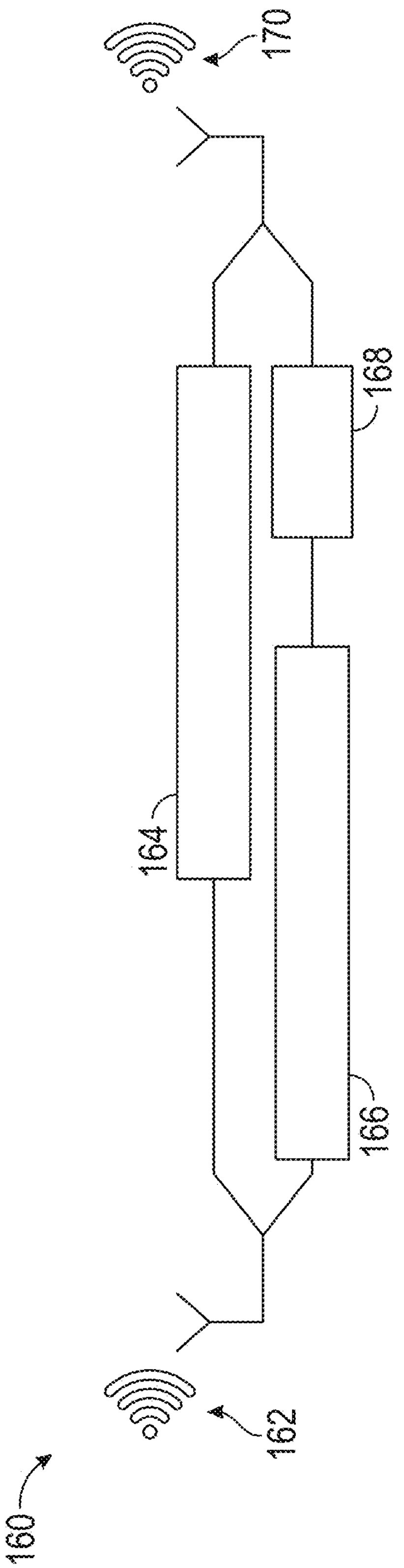
Figure 2:
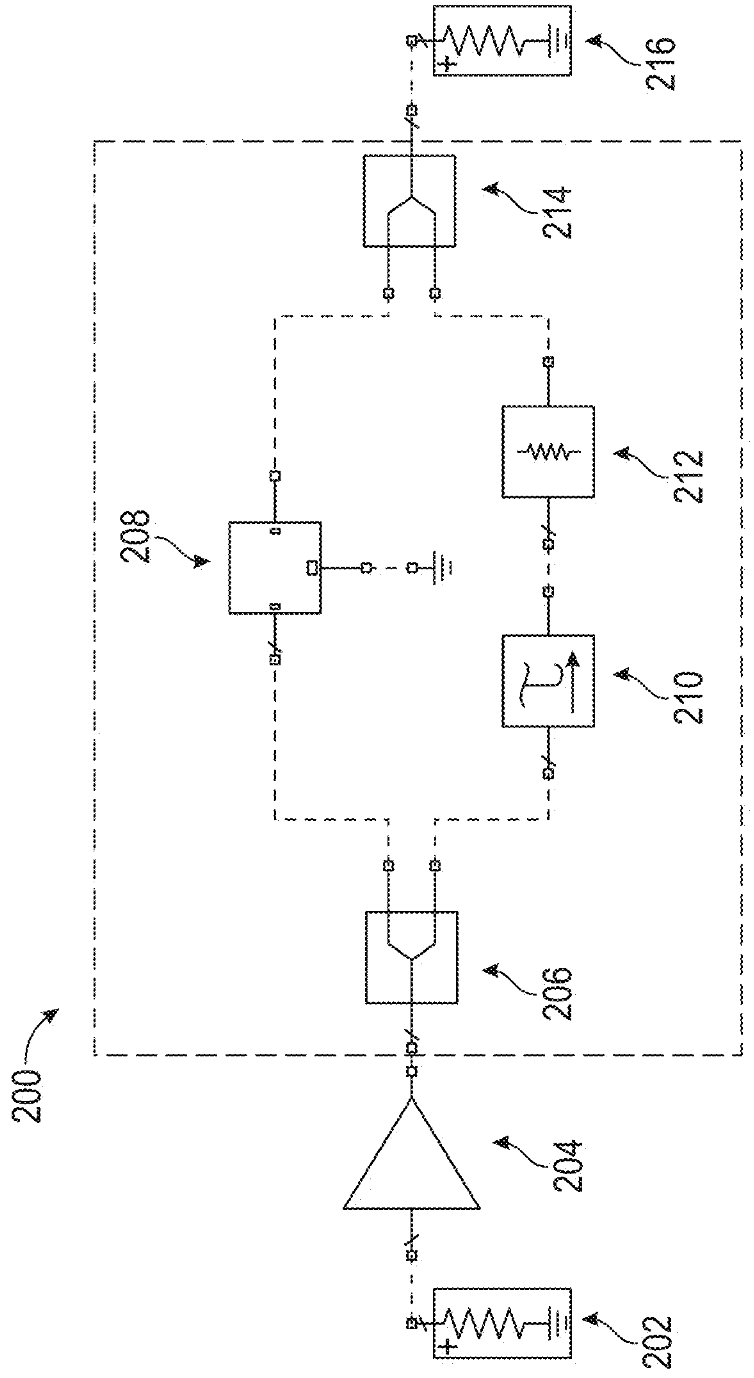
FIG. 2 illustrates an exemplary tunable bandstop filter, according to embodiments of this disclosure.

Turning to FIG. 2, FIG. 2 illustrates an exemplary tunable bandstop filter 200. In some embodiments, the bandstop filter 108, 124, 146, or 168 (as described with respect to FIGS. 1A-1D) comprises the tunable bandstop filter 200. In some embodiments, the tunable bandstop filter attenuates a signal from a component (e.g., receiving antenna, transceiver 166, a receiver or a transmitter of a simultaneous transmit and receive (STaR) system), represented by input load 202. For example, the signal may originate from interfering signal 104, transmission signal 122, received signal 142, or received signal 162. In some embodiments, the signal from the source is processed by circuitry, such as buffer 204, before reaching the tunable bandstop filter 200.

In some embodiments, the bandstop filter 200 comprises a bandpass filter 208, a delay element 210, and an amplitude adjustor 212. In some embodiments, the bandstop filter 200 further comprises a splitter 206 (e.g., a power splitter) for providing the signal to the bandpass filter 208 and delay element 210, and a combiner 214 for combining the output of the bandpass filter 208 and the output of the amplitude adjuster 212.

In some embodiments, the bandstop filter 200 is coupled to one or more processors and/or circuitry (not shown) are configured to tune the components of the bandstop filter 200, allowing the bandstop filter 200 to attenuate an unwanted frequency component that may be different in different applications and environments. In some embodiments, the unwanted frequency component is 2-18 GHz. In some embodiments, the one or more processors are configured to determine the frequency of the unwanted frequency component (e.g., for adjusting component parameters to attenuate the unwanted frequency component). Although bandstop filter 200 tuning is described with respect to one or more processors and/or circuitry, it should be appreciated that other components may be used to perform the tuning described herein.

In some embodiments, the output of the bandstop filter 200 (e.g., a signal with the unwanted frequency component attenuated) is received by the load 216.

In some embodiments, the tunable bandstop filter 200 is coupled to another component (e.g., receiver 110, transceiver 126, transceiver 148, transmitting antenna, a receiver or a transmitter of a STaR system), represented by load 216. In some embodiments, the system comprises one or more processors configured to change the parameters of one or more of the described elements, to tune the frequency being attenuated.

Although the tunable bandstop filter 200 is described with respect to the components illustrated in FIG. 2, it should be appreciated that the tunable bandstop filter 200 may comprise and/or couple to different components as illustrated. For example, the connection of the delay element 210 and amplitude adjustor 212 may be reversed. As another example, the bandstop filter may not comprise the amplitude adjustor 212. As another example, the delay element 210 may be coupled to the bandpass filter 208 to adjust the delay of the filter output for the attenuation described herein. As another example, the amplitude adjustor 212 may be coupled to the bandpass filter 208 to compensate for the filter loss.

In some embodiments, the signal passes through the amplifier 204 and the splitter 206. In some embodiments, the splitter 206 splits the signal into a first signal to the bandpass filter 208 and a second signal to the delay element 210. For example, the splitter 206 splits the input signal evenly, such that the first signal and the second signal are equal in amplitude. It should be appreciated that the use of the splitter 206 for splitting the signal is exemplary, and that other components may be used to provide signals to the bandpass filter and delay element for attenuating an unwanted frequency component.

In some embodiments, the first signal passes through the bandpass filter 208 on a first branch. In some embodiments, the second signal passes through the delay element 210 and the amplitude adjustor 212 on a second branch. In some embodiments, the signals on the first and the second branches are joined using the combiner 214. It should be appreciated that the use of the combiner 214 for combining the signals is exemplary, and that other components may be used to combine the outputs of the bandpass filter 208 and the amplitude adjustor 212 to provide a combined signal to the load 216.

In some embodiments, the bandpass signal (e.g., output from the bandpass filter 208), the delayed second signal (e.g., output from delay element 210), and the amplitude-adjusted signal (e.g., output from amplitude adjustor 212) are used to attenuate the unwanted frequency component.

In some embodiments, the bandpass filter 208 is configured to output a bandpass signal which comprises the frequencies of the signal which fall within a pass band. In some embodiments, the bandpass filter comprises a programmable bandpass filter.

In some embodiments, the bandpass filter 208 is configured to attenuate frequencies below a first frequency threshold and attenuate frequencies above a second frequency threshold, such that the pass band is between the first frequency threshold and the second frequency threshold. In some embodiments, the first frequency threshold is greater than the frequency of the signal and the second frequency threshold is less than the unwanted frequency component, such that the bandpass filter 208 allows the unwanted frequency component to pass. As described in more detail herein, the bandpass filter of the tunable bandstop filter may advantageously eliminate harmonic nulls that attenuate frequency components other than unwanted ones, which is undesirable.

In some embodiments, the one or more processors are configured to modify the pass band of the bandpass filter (e.g., by modifying programmable bandpass filter parameters). For example, the one or more processors are configured to adjust the first frequency threshold and the second frequency threshold. In some embodiments, the one or more processors are configured to determine the first frequency threshold and the second frequency threshold. For example, the one or more processors are configured to modify the first frequency threshold and the second frequency threshold based on the unwanted frequency component, such that the unwanted frequency component is between the first frequency threshold and the second frequency threshold. In some embodiments, the one or more processors are configured to adjust one or more passband gain and roll-off characteristics (e.g., to achieve desired stopband characteristics corresponding to the bandstop filter).

In some embodiments, the delay element 210 is configured to add a time delay to the second signal (e.g., from the splitter 206). In some embodiments, the delay element comprises a phase shifter. The phase shifter may output a delayed second signal, which has same frequency as the second signal, but is at a different phase relative to the second signal. In some embodiments, the delay element comprises a programmable delay element.

In some embodiments, the one or more processors are configured to determine a delay of the bandpass filter 208. In some embodiments, the one or more processors are configured to determine, based on the delay of the bandpass filter 208 and a delay corresponding to the unwanted frequency component, a delay to add to the second signal. For example, the delay added to the second signal is determined based on the delay of the bandpass filter 208 at the unwanted frequency. Examples of bandpass filter delay as a function of frequency are described in more detail herein. In some embodiments, determining the delay of the bandpass filter 208 comprises retrieving a known or predetermined value of the delay (e.g., from calibration, via bandpass filter specifications).

In some embodiments, the determination of the delay to add to the second signal comprises determining a 180-degree phase shift at the unwanted frequency. For example, the delay added to the second signal is determined such that the delayed second signal at the unwanted frequency is anti-phase relative to the output of the bandpass filter 208, which is the bandpassed version of the first signal delayed by the bandpass filter delay at the unwanted frequency. The two anti-phase signals may be combined, and the combined signal may comprise an attenuated unwanted frequency component.

In some embodiments, the delay added to the second signal comprises the delay of the bandpass filter and the 180-degree phase shift. For example, the signal may be delayed by the sum of the 180-degree phase shift and the delay of the bandpass filter at the unwanted frequency. In some embodiments, the one or more processors are configured to cause the delay element to add the delay to the signal, generating the delayed second signal.

In some embodiments, the amplitude adjustor 212 is configured to modify the amplitude of a signal. In some embodiments, the amplitude adjustor 202 is configured to modify the amplitude of the delayed second signal at the unwanted frequency.

In some embodiments, the one or more processors are configured to determine the amplitude adjustment. In some embodiments, the determination of the amplitude adjustment comprises determining a loss of the bandpass filter 208. In some embodiments, the determination of the loss of the bandpass filter 208 comprises determining the amplitude of the bandpass signal (e.g., determining an amplitude difference between the first signal and the output of the bandpass filter 208 at the unwanted frequency). For example, the amplitude adjustment may account for the amplitude decrease at the bandpass filter output, so that the amplitude-adjusted signal has the same amplitude as the bandpass signal, for better attenuation of the unwanted frequency component after combining the output of the bandpass filter and the output of the amplitude adjustor.

In some embodiments, the one or more processors are configured to cause the amplitude adjustor to modify the amplitude of a signal at the unwanted frequency to output an amplitude-adjusted signal. For example, as illustrated, the amplitude adjustor is configured to adjust the amplitude of the signal outputted from the delay element 210, such that its amplitude at the unwanted frequency is the same as the amplitude of the bandpass filter output signal at the unwanted frequency.

In some embodiments, the amplitude adjustor comprises an attenuator configured to decrease the amplitude of a signal. In some embodiments, the amplitude adjustor comprises an amplifier configured to increase the amplitude of a signal.

In some embodiments, the one or more processors are configured to determine the delay to add to the first signal (e.g., by delay element 210) based on a calculation. For example, the delay to be added may be determined based on the following equation.

$$\tau = \text{delay}(S_{ABF-9R3G+@9.3GHz}(2,1)) + \frac{1}{2*9.3\text{ GHz}} \quad (1)$$

In some embodiments, the one or more processors are configured to determine the amplitude adjustment based on a calculation. For example, the amount of amplitude adjustment may be determined based on the following equation.

$$L = \text{dB}(S_{ABF-9R3G+@9.3GHz}(2,1)) \quad (2)$$

In the examples described with respect to Equation 1 and Equation 2, the unwanted frequency component is at 9.3 GHz and the bandpass filter comprises a Mini-Circuits ABF-9R3G+. S(2,1) represents a scattering parameter describing a relationship between port 1 and port 2 of the bandpass filter. Equation 1 references the scattering parameter to determine the group delay of the bandpass filter at 9.3 GHz. Equation 2 references the scattering parameter to determine the signal loss of the bandpass filter at 9.3 GHz. It should be appreciated that the equations for determining delay to be added and amplitude adjustment may be modified to different unwanted frequency components and/or for different bandpass filters.

An exemplary equation for calculating the time delay comprises determining the delay of the ABF-9R3G+ bandpass filter and adding it to one half of the inverse of the frequency (half of a period of the unwanted frequency). delay($S_{ABF-9R3G+@9.3GHz}$(2,1)) represents the bandpass filter group delay at the unwanted frequency (e.g., 9.3 GHz). Examples of bandpass filter delays at different frequencies are described in more detail herein.

An exemplary equation for calculating the amplitude adjustment comprises determining the amplitude loss of the ABF-9R3G+ bandpass filter. dB($S_{ABF-9R3G+@9.3GHz}$(2,1)) represents bandpass filter loss at the unwanted frequency (e.g., 9.3 GHz). In some embodiments, these calculations are performed by the one or more processors. In some embodiments, inputs to these equations are stored in memory (e.g., in a lookup table) and the one or more processors are configured to retrieve the appropriate inputs based on the unwanted frequency.

In some embodiments, the delay and loss of the bandpass filter 208 are manually determined (e.g., via calibration, via bandpass filter specifications). In some embodiments, the one or more processors are configured to determine the time delay and the amplitude loss of the bandpass filter 208 (e.g., via measuring and comparing the signal delays and amplitudes at the different nodes of the bandpass filter 208).

In some embodiments, the one or more processors are configured to determine a level of the attenuation of the unwanted frequency of the signal. In some embodiments, the delay and the amplitude adjustment are determined further based on the level of the attenuation. For example, the attenuation of the unwanted frequency component may be adjusted based on feedback. The one or more processors may determine the attenuation level, and the attenuation level may not be satisfactory to meet system performance. In response, the one or more processors may modify one or more of the bandpass filter parameters, delay, and amplitude adjustment in the bandstop filter, such that the signals at the combiner are better aligned for cancellation at the unwanted frequency.

In some embodiments, the tunable bandstop filter 200 is configured to attenuate a second frequency. For example, the second frequency is a second unwanted frequency, corresponding to a different or changing environment and/or application associated with the first unwanted frequency. In some embodiments, the one or more processors are configured to determine the second unwanted frequency, and the tunable bandstop filter 200 is configured to attenuate the second frequency according to the determined second frequency.

In some embodiments, the second frequency is attenuated based on a second bandpass signal (e.g., output from the bandpass filter 208), a second delayed signal (e.g., output from delay element 210), and a second amplitude-adjusted signal (e.g., output from amplitude adjustor 212). The parameters of the tunable bandstop filter 200 may be adjusted to generate the second bandpass signal, the second delayed signal, and the second amplitude-adjusted signal, and attenuate the second unwanted frequency.

In some embodiments, the one or more processors are configured to determine a second bandpass signal, a second delayed signal, and a second amplitude-adjusted signal based on the second frequency. For example, these signals for attenuating the second unwanted frequency component may be determined similarly as the first bandpass signal, the first delayed signal, and the first amplitude-adjusted signal.

In some embodiments, determining the second bandpass signal comprises determining a second set of frequency thresholds of the bandpass filter. For example, the passband of the bandpass filter 208 is adjusted, such that the bandpass filter 208 passes the second unwanted frequency component. In some embodiments, the determination of the second delayed signal comprises determining a second delay to add to the signal based on the second bandpass signal. For example, the second delay is determined based on the frequency of the second unwanted frequency component, as described herein. In some embodiments, determining the second amplitude-adjusted signal comprises determining the second amplitude adjustment based on the second bandpass signal. For example, this amplitude adjustment is determined based on loss of the bandpass filter at the second unwanted frequency, as described herein.

Advantageously, by adjusting as described to attenuate a second unwanted frequency component, the bandstop filter 200 may be tuned faster than existing filter systems, preventing varying unwanted frequency components from interfering with system operations.

In some embodiments, the one or more processors are configured to determine a temperature of the system. In some embodiments, the delay and the amplitude adjustment are determined further based on the temperature of the system. In some examples, the bandpass filter delay and loss are affected by temperature. Determining the delay and amplitude adjustment further based on the temperature further improves attenuation of the unwanted frequency component.

Returning to FIGS. 1B-1D, FIGS. 1B-1D illustrate additional exemplary systems comprising a tunable bandstop filter. In some embodiments, these systems comprise one or more of receivers, transmitters, transceivers, and bandstop filters. In some embodiments, these systems comprise one or more STaR systems.

FIG. 1B illustrates an exemplary system 120 in which a bandstop filter 124 (e.g., bandstop filter 200) is coupled to a transceiver 126 comprising a transmitter. In some embodiments, the transceiver 126 comprises a STAR system. In some embodiments, the transmitter is configured to transmit a signal comprising an interfering signal. That is, FIG. 1B illustrates an example where the system's transmitted signals may interfere with itself. In some embodiments, the system 120 comprises one or more processors and/or circuitry (not shown) for performing the operations described herein.

In some embodiments, the system may generate a transmission signal 128 and receive the transmission signal 122, such that the transmission signal 122 may interfere with operation of system 120. For example, the transmission signal 128 is a signal intended for jamming other systems. In this example, the bandstop filter 124 attenuates the received transmission signal 122 (as described herein) before it is received by the transceiver 126. This example system configuration may be used if a frequency of the received transmission signal 122 may interfere with the transceiver 126. For example, it may be advantageous to attenuate an unwanted frequency of the transmission signal 128 at the receiving end of the system 120.

The bandstop filter 124 may be tuned to selectively attenuate the unwanted frequency of the transmission signal 128 to prevent such interference and improve the performance of system 120. In some embodiments, system is configured to automatically determine the unwanted frequency of the transmission signal 128 and tune the bandstop filter 124 to attenuate the unwanted frequency (as described herein). In some embodiments, system is configured to determine, based on the amplitude of the transmission signal 128, a level of attenuation required by bandstop filter 124, such that unwanted frequency component of received transmission signal 122 does not affect system operation. In some embodiments, the system is configured to tune the bandstop filter 124 to cause the determined level of attenuation (as described herein).

FIG. 1C illustrates an exemplary system 140 in which a first transceiver 144 and a second transceiver 148 are arranged in parallel. In some embodiments, the first transceiver 144 comprises a first receiver and a first transmitter, and the second transceiver 148 comprises a second receiver and a second transmitter. In some embodiments, the first transceiver 144 and the second transceiver 148 comprise STaR systems. As illustrated, a bandstop filter 146 (e.g., tunable bandstop filter 200) is coupled to the transceiver 148 (e.g., at a receiving end of the transceiver). In some embodiments, the system 140 comprises one or more processors and/or circuitry (not shown) for performing the operations described herein.

FIG. 1C may illustrate an example where the first transceiver 144 and the second transceiver 148 have conflicting capabilities, such that the transmission signals from the first transceiver 144 would degrade the performance of the second transceiver 148.

The first transceiver 144 and/or the second transceiver 148 may transmit a transmitted signal 150. In some embodiments, the transmitted signal 150 may propagate to the receiving end of the system 140 as the received signal 142. In this example, a received signal 142 is received by the transceiver 144. And the bandstop filter 146 advantageously attenuates unwanted frequency components of the received signal 142 before it is received by the second transceiver 148. This example configuration may be used for transceivers with different operating requirements, for example, a transceiver operating at a one frequency that maybe an unwanted frequency for another transceiver.

The system may also be used if the second transceiver 148 is vulnerable to non-cooperative frequencies, and the frequency of the received signal 142 is not known. In some embodiments, the system is configured to determine, based on the first transceiver 144, the frequency of the received signal 142 (and determine the unwanted frequency based on the frequency of the received signal 142).

In some embodiments, the system is configured to tune the bandstop filter 146 to selectively attenuate the determined unwanted frequency (as described herein). This may be advantageous to prevent the second transceiver 148 from receiving interfering signals. In some embodiments, the system is configured determine the amplitude of the received signal 142 at the unwanted frequency and tune the bandstop filter 146 to cause the determined level of attenuation (such that operation of second transceiver 148 is not affected). In some embodiments, the system is configured to determine the frequency of the transmitted signal 150 (and unwanted frequency component in the transmitted signal 150) and tune the bandstop filter 146 to attenuate the frequency. In some embodiments, the system is configured to determine, based on the amplitude of the transmitted signal 150 at the unwanted frequency, a level of attenuation of the received signal 142 at the unwanted frequency, and cause the tunable bandstop filter 146 to cause the determined level of attenuation (such that operation of second transceiver 148 is not affected).

FIG. 1D illustrates an exemplary system 160 in which a first transceiver 164 and a second transceiver 166 are arranged in parallel, and a bandstop filter 168 (e.g., tunable bandstop filter 200) is coupled to the second transceiver 166 (e.g., a transmitting end of the transceiver) as illustrated. In some embodiments, the system 160 comprises one or more processors and/or circuitry (not shown) for performing the operations described herein.

In some embodiments, the first transceiver 164 and the second transceiver 166 comprise STaR systems. FIG. 1D may illustrate an example where a signal outputted by the transceiver 166 may interfere with the system 160 if received.

The system 160 may generate a transmitted signal 170, which comprises signals transmitted by the first transceiver 164 and/or the second transceiver 166. In some embodiments, the transmitted signal 170 propagates to the receiving end of the system 160 as the received signal 162. In example, a signal outputted by the second transceiver 166 is attenuated at an unwanted frequency (by bandstop filter 168) before being transmitted by the system. This example system may be used if a signal outputted by the transceiver 166 may comprise unwanted frequency components interfering with the other components of the system 160 if received. It may also be used if the outputs of the transceivers 164 and 166 interfere with each other, and the bandstop filter 168 may reduce the interference at the transmission end of the system 160.

In some embodiments, the system is configured to determine the unwanted frequency to be attenuated and tune the bandstop filter 168 to attenuate the determined unwanted frequency. In some embodiments, the system is configured to determine the amplitude of the signal transmitted and determine a level of attenuation by bandstop filter 168. In some embodiments, the system is configured to adjust the tunable bandstop filter 168 parameters (as described herein) to cause the determined level of attenuation.

Figure 3:
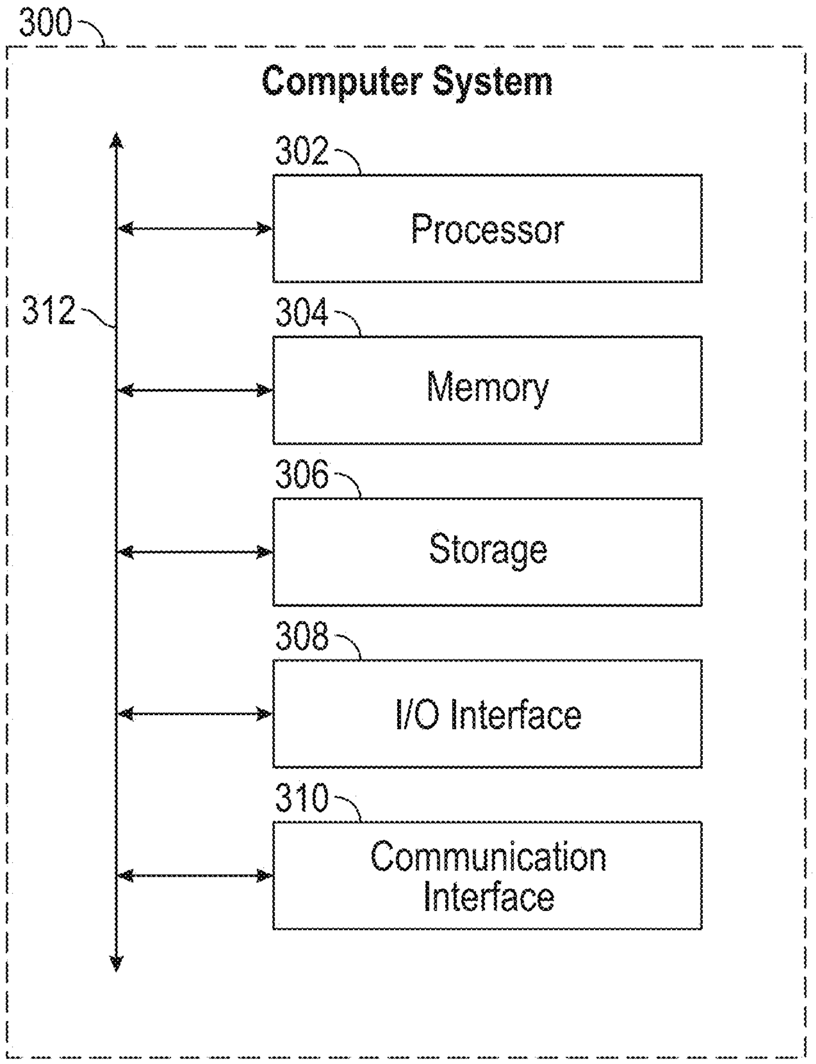
FIG. 3 illustrates an exemplary computer system, according to embodiments of this disclosure.

Turning to FIG. 3, FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In some embodiments, the computer system 300 is coupled to any of the systems described in FIGS. 1A-1D and FIG. 2. In some embodiments, any of the systems described in FIGS. 1A-ID and FIG. 2 is a part of the computer system 300. In some embodiments, the computer system 300 is configured to control the components as described with respect to FIG. 2. The computer system 300 may be coupled to the tunable bandstop filter 200 and perform operations for changing the bandstop filter operation (e.g., changing unwanted frequency being attenuating, changing a level of attenuation). In some embodiments, the computer system 300 is configured to perform the operations described with respect to FIGS. 1A-1D, 2, and 4.

In some embodiments, the computer system 300 causes changes to the parameters of the bandpass filter 208, the delay element 210, the amplitude adjustor 212, or any combination thereof. For example, the computer system 300 uses Equation 1 and Equation 2 to determine a delay to add to the signal and an amplitude adjustment. In some embodiments, the computer system 300 determines an unwanted frequency of an incoming signal. In some embodiments, the computer system 300 determines an unwanted frequency transmitted by a transmitter. In some embodiments, the computer system 300 determines an unwanted frequency received by a receiver. In some embodiments, the computer system 300 changes parameters of the tunable bandstop filter 200 to attenuate the determined unwanted frequency. In some embodiments, the computer system 300 determines a level of attenuation of the unwanted frequency and change the parameters of the tunable bandstop filter 200 to attenuate the unwanted frequency component at the determined level.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In some embodiments, the processor 302 is coupled to any of the systems described in FIGS. 1A-D and FIG. 2. In some embodiments, the processor 302 executes instructions to change the parameters of the tunable bandstop filter 200. In some embodiments, the processor 302 is coupled to one or more components of the tunable bandstop filter 200. In some embodiments, the processor executes instructions to change the parameters of the bandpass filter 208, the delay element 210, the amplitude adjustor 212, or any combination thereof. For example, the processor 302 uses Equation 1 and Equation 2 to determine a delay to add to the signal and an amplitude adjustment. In some embodiments, the processor 302 determines an unwanted frequency of a signal. In some embodiments, the processor 302 determines an unwanted frequency transmitted by a transmitter. In some embodiments, the processor 302 determines an unwanted frequency received by a receiver. In some embodiments, the processor 302 changes the parameters of the tunable bandstop filter 200 to attenuate the determined unwanted frequency. In some embodiments, the processor 302 determines a level of attenuation, and change the parameters of the tunable bandstop filter 200 to attenuate the unwanted frequency component at the determined level.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In some embodiments, the memory 304 stores instructions and inputs for tuning the tunable bandstop filter 200. In some embodiments, the memory 304 stores instructions and inputs for changing the parameters of the bandpass signal, the delay element, the amplitude adjustor, or any combination thereof. In some embodiments, the memory 304 stores instructions and inputs for using Equation 1 and Equation 2 to determine a delay to add to the signal and an amplitude adjustment. In some embodiments, the memory 304 stores additional information about the system. For example, the memory may store a pre-determined level of attenuation of the signal, performance parameters, and operating conditions.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, sensors, markers, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. In some embodiments, the communication interface 310 comprises one or more antennas described with respect to FIGS. 1A-1D and FIG. 2. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless.

As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some embodiments, a non-transitory computer readable storage medium stores one or more programs, and the one or more programs includes instructions. When the instructions are executed by an electronic device (e.g., systems 106, 120, 140, 160, 300; a system comprising bandstop filter 200) with one or more processors and memory, the instructions cause the electronic device to perform the methods described with respect to FIGS. 1A-1D, 2, and 4.

Figure 4:
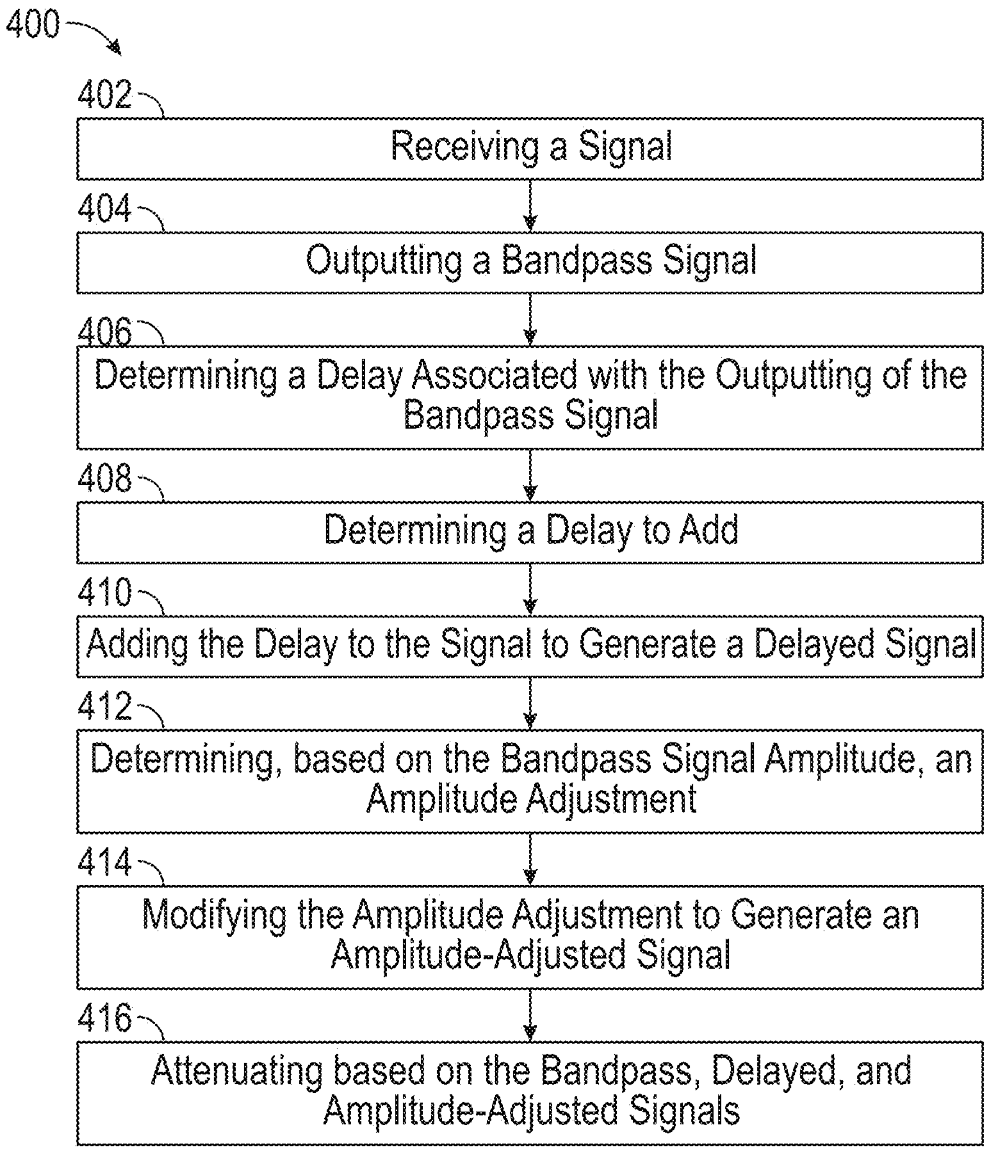
FIG. 4 illustrates an exemplary method for operating a tunable bandstop filter, according to embodiments of this disclosure.

FIG. 4 illustrates an exemplary method 400 for attenuating an unwanted frequency component of a signal with a bandstop filter. In some embodiments, the steps of method 400 are performed by one or more components described with respect to FIGS. 1A-1D and 2, and/or components of system 300. It should be appreciated that steps described with respect to FIG. 4 are exemplary. The method 400 may include fewer steps, additional steps, or different order of steps than described. It is appreciated that the steps of method 400 leverage the features and advantages described with respect to FIGS. 1A-1D and 2.

In some embodiments, the method 400 comprises receiving a signal comprising an unwanted frequency component (step 402). For example, as described with respect to FIG. 1A, the environment 100 receives an interfering signal 104 transmitted by a source 102.

In some embodiments, the method 400 comprises outputting a bandpass signal (step 404) by attenuating frequencies of an input signal below a first frequency threshold and attenuating frequencies of the input signal above a second frequency threshold. For example, as described with respect to FIG. 2, the bandpass filter 208 outputs a bandpass signal by attenuating frequencies below the first frequency threshold and frequencies above the second frequency threshold of the first signal, such that the bandpass filter 208 passes the unwanted frequency component.

In some embodiments, the method 400 comprises determining a delay associated with the outputting of the bandpass signal (step 406). For example, as described with respect to FIG. 2, a delay associated with the bandpass filter 208 is determined.

In some embodiments, the method 400 comprises determining a delay to add (step 408). For example, as described with respect to FIG. 2, a delay to be added is determined based on the delay of the bandpass filter 208 at the unwanted frequency.

In some embodiments, the method 400 comprises adding the delay to generate a delayed signal (step 410). For example, as described with respect to FIG. 2, the delay element 210 adds a delay to the second signal, generating a delayed second signal.

In some embodiments, the method 400 comprises determining, based on the bandpass signal amplitude, an amplitude adjustment (step 412). For example, as described with respect to FIG. 2, a loss of the bandpass filter 208 is determined. Based on the loss, the amplitude adjustment is determined.

In some embodiments, the method 400 comprises modifying a third portion of the signal by the amplitude adjustment to generate an amplitude-adjusted signal (step 414). For example, as described with respect to FIG. 2, the amplitude adjustor 212 modifies the amplitude of the second signal.

In some embodiments, the method 400 comprises attenuating the signal based on the bandpass, delayed, and amplitude-adjusted signals (step 416). For example, as described with respect to FIG. 2, the bandstop filter outputs a signal based on the bandpass signal generated by the bandpass filter 208, the delayed signal generated by the delay element 210, and the amplitude-adjusted signal generated by the amplitude adjustor 212. In some embodiments, the combiner 214 provides the attenuated signal by combining the outputs of the bandpass filter 208 and the amplitude adjustor 212.

Figure 5A:
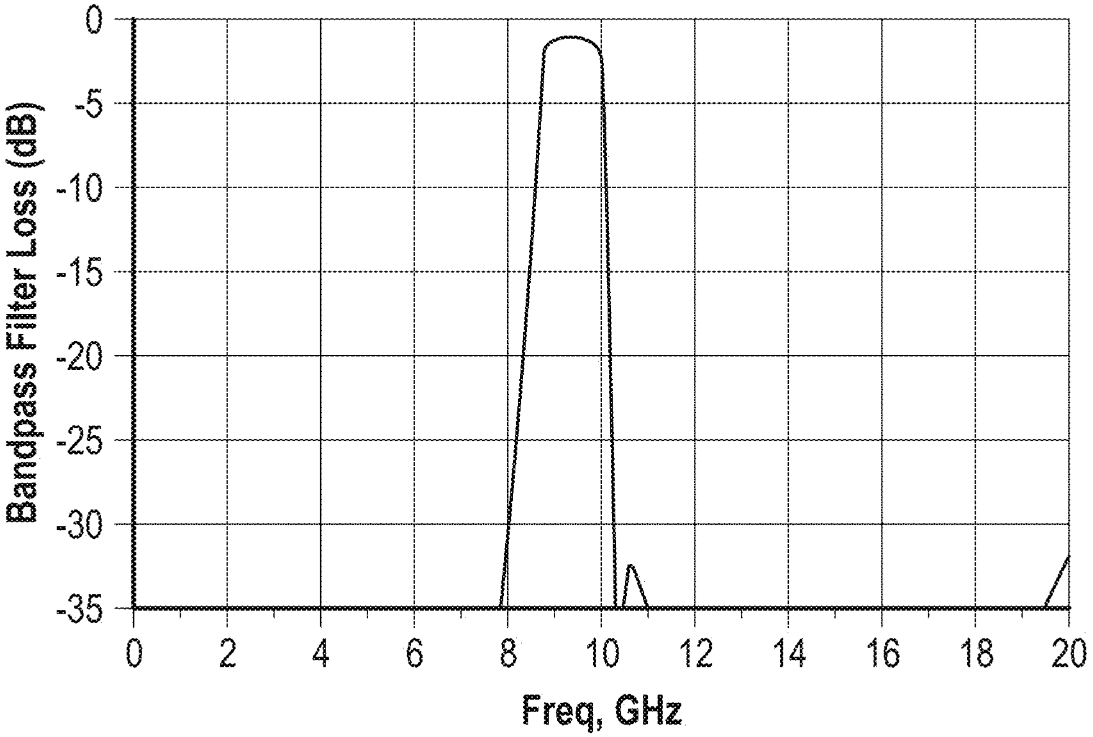
FIGS. 5A and 5B illustrate plots of exemplary bandpass filter and bandstop filter characteristics, according to embodiments of this disclosure.
Figure 5B:
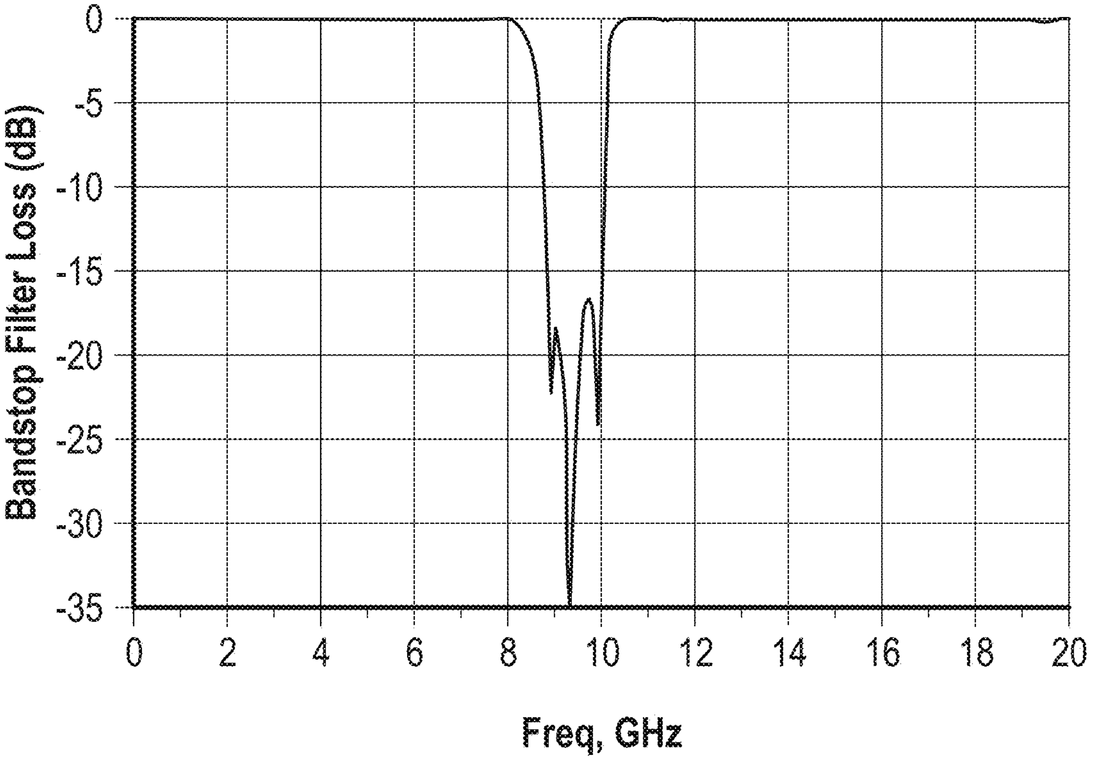

FIGS. 5A and 5B illustrate plots of exemplary values of bandpass filter (e.g., bandpass filter 208) loss and bandstop filter (e.g., bandstop filter 200) attenuation at various frequencies. In some embodiments, a disclosed system is configured to determine the bandpass filter and the bandstop filter characteristics (for performing the operations described herein); FIGS. 5A and 5B show examples of these characteristics. In these examples, the bandpass filter comprises a Mini-Circuits ABF-9R3G+, which may pass signal having a component at 9.3 GHz (e.g., an unwanted frequency component). In some embodiments, the system is configured to transmit signals at frequencies between 0 and 20 GHz, and the passband of the bandpass filter is configured such that the component at 9.3 GHz is allowed to pass. A signal loss of the bandpass filter may be determined by computing the ratio of or a difference between an amplitude of the bandpass filter output to an amplitude of the bandpass filter input. The signal loss associated with the bandpass filter and the attenuation of the bandstop filter are determined at each of the plurality of frequencies and stored may be stored in the system's memory for future operations or used for more accurate adjustment for improved attenuation.

FIG. 5A illustrates exemplary signal loss of the bandpass filter (e.g., bandpass filter 208) from 0-20 GHz. In this example, the bandpass filter is configured to output a bandpass signal at 9.3 GHz (e.g., an unwanted frequency component). The plot illustrates that there is minimal signal loss (less than 5 dB) in a passband ranging from 8.5 GHz (e.g., first frequency threshold) and 10 GHz (e.g., second frequency threshold). The signal loss in the passband may be used for determining an amount of adjustment by the amplitude adjustor 212.

As illustrated, outside of this passband, there is a steeper increase in signal loss magnitude. The signal loss for frequencies below 7.8 GHz or above 11 GHz is at least 35 dB. These results indicate that the bandpass filter allows a narrow band of frequencies with minimal signal loss and attenuates all other frequencies, as intended. Advantageously, the bandpass filter characteristics allow elimination of harmonic nulls that attenuate frequency components other than unwanted ones, which is undesirable.

FIG. 5B illustrates measurements of attenuation at various frequencies from 0-20 GHz. FIG. 5B illustrates example attenuation characteristics of the tunable bandstop filter 200. For example, when using the Mini-Circuits ABF-9R3G+ bandpass filter, the bandstop filter is configured to reject signals at 9.3 GHz with a narrow stop band, as illustrated. The plot illustrates that the peak attenuation attained at 9.3 GHz, with a 35 dB decrease in signal intensity. The plot also indicates that the level of attenuation falls off steeply on both sides of the peak. Within the range of 8.5 to 10 GHz, the level of attenuation is at least 20 dB. However, frequencies less than 8 GHz or greater than 10.5 GHz are not subjected to attenuation (e.g., 0 dB). These results indicate that the exemplary bandstop filter achieves strong and precise attenuation.

It should be appreciated that the attenuation characteristics may be tuned as described herein. For example, by adjusting the width of the passband (e.g., by adjusting the first and second frequency thresholds of the bandpass filter), the width of the stopband of the bandstop filter maybe adjusted. As another example, by adjusting the center frequency of the bandpass filter passband and setting an appropriate delay, the notch frequency of the bandstop filter may be adjusted.

Figure 6A:
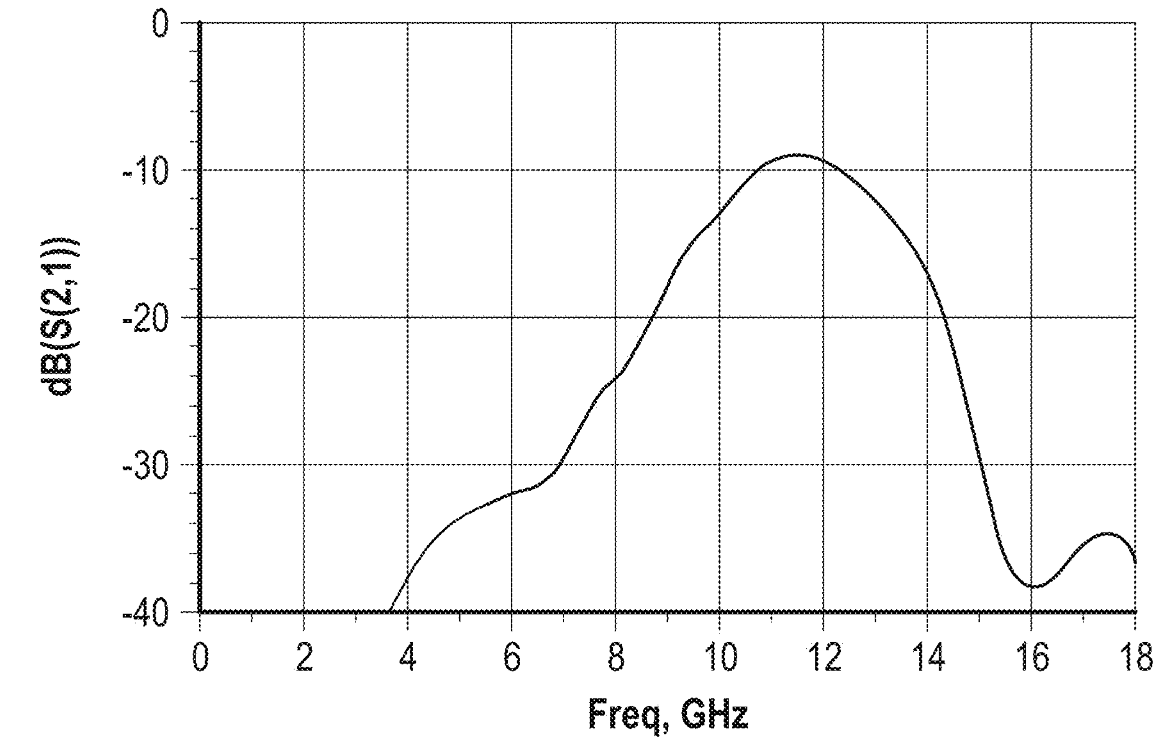
FIG. 6A illustrates a plot of exemplary bandpass filter characteristics, according to embodiments of this disclosure.
Figure 6B:
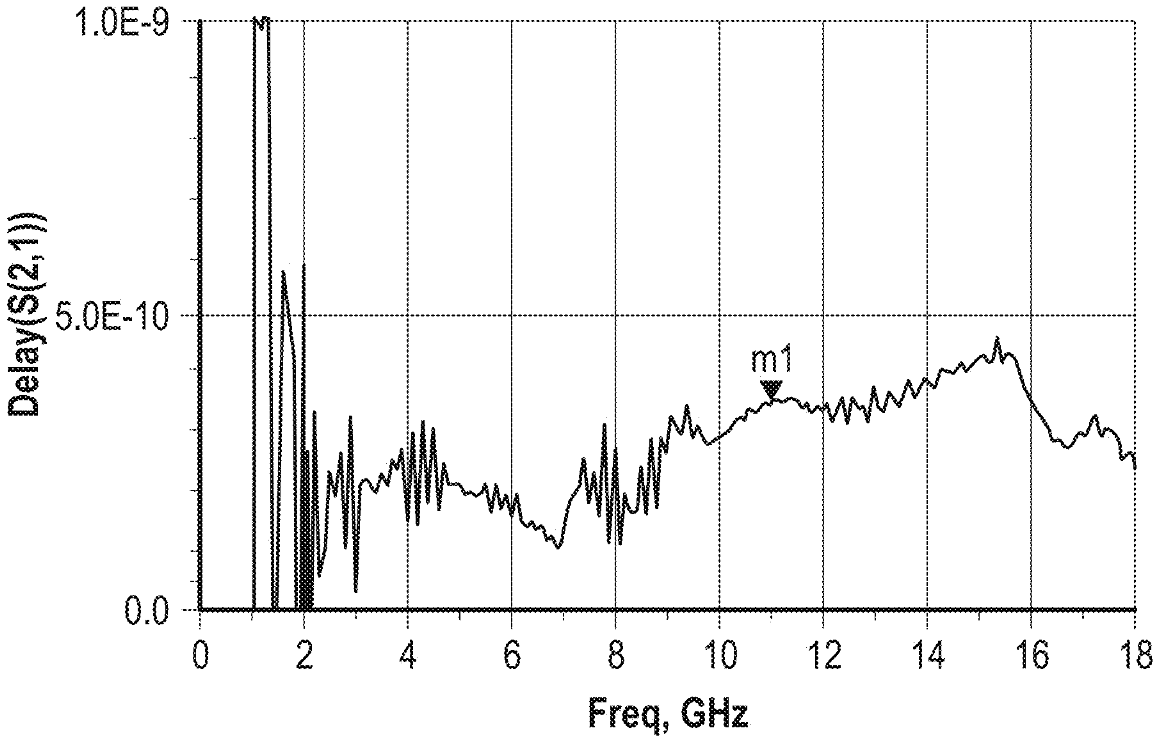
FIG. 6B illustrates a plot of exemplary bandpass filter time delay, according to embodiments of this disclosure.

FIGS. 6A and 6B illustrate plots of exemplary values of the signal loss of the bandpass filter and the time delay associated with bandpass filter at different frequencies. These plots may be exemplary values of the bandpass filter passband and delay, as described with respect to FIG. 2.

The disclosed system may determine these values associated the bandpass filter and the bandstop filter, and adjust the delay element and the amplitude adjustor accordingly, as described herein. In these examples, the bandpass filter comprises an AM3043, which is a digitally tunable bandpass filter operating between 6.5 and 17 GHz. In these examples, the bandpass filter is tuned with the passband centered around 11 GHz. This example may be used with an ADAR4000 transmitter configured to transmit signals having frequencies between 2 and 18 GHz. The bandpass filter of the bandstop filter may be configured to attenuate unwanted frequency components from the transmitter, such that the transmitted signals would not interfere with the system.

FIG. 6A illustrates measurements of the signal loss of the bandpass filter (e.g., bandpass filter 208) at frequencies between 2 and 18 GHz. The plot illustrates that the bandpass filter attenuates signals at frequencies outside of 4-16 GHz, with a passband in the 4-16 GHz range. Within this range, the level of attenuation varies from 10 to 40 dB. Signals experience the lowest attenuation around 11 GHz (e.g., center of the passband). These measurements illustrate that the AM3043 bandpass filter operates between 6.5 and 17 GHz and is tuned to pass signals at 11 GHz, for example, to allow unwanted frequency component at 11 GHz as described herein.

FIG. 6B illustrates example time delay of the bandpass filter (e.g., bandpass filter 208) at frequencies from 2 to 18 GHz. As described herein, the time delay of the bandpass filter may be used to determine an amount of delay applied by the delay element for attenuation of the unwanted frequency component.

In this example, the plot illustrates that at 11 GHz (e.g., the unwanted frequency component), the bandpass filter has a 380 ps of delay, as indicated by marker m1. Based on this 380 ps of bandpass filter delay, the amount of delay applied by the delay element may be 380 ps plus half a period corresponding to 11 GHz, such that combining the output of bandpass filter and the output of the amplitude adjustor achieves attenuation at 11 GHz.

Figure 6C:
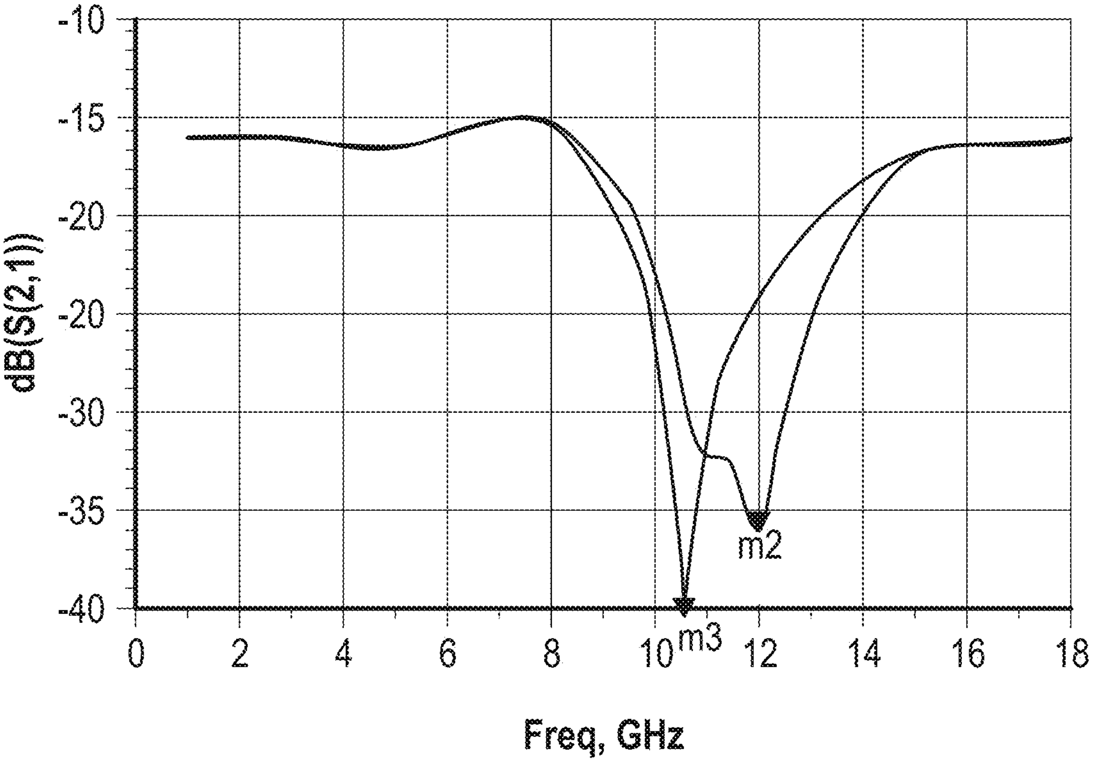
FIG. 6C illustrates a plot of exemplary bandstop filter characteristics, according to embodiments of this disclosure.

FIG. 6C illustrates bandstop filter characteristics at frequencies from 2-18 GHz for different notch frequencies, corresponding to bandpass filter time delays 378 ps and 382 ps (based on data illustrated in FIG. 6B). These two values are used because the peak bandstop filter rejection was achieved at 380 ps, and the delay adjustments may have a 4 ps resolution. The peak attenuation associated with a 378 ps delay is indicated by marker m2, and the peak attenuation associated with a 382 ps delay is indicated by marker m3. Both configurations result in a 20 dB rejection (relative to −16 dB outside of the stopband) with stopband having around a 5 GHz width. These results illustrate that the disclosed bandstop filter outperforms existing traditional notch or band reject filters. Furthermore, the disclosed bandstop filter may be tunable to attenuate different unwanted frequency components, as discussed herein.

Figure 7:
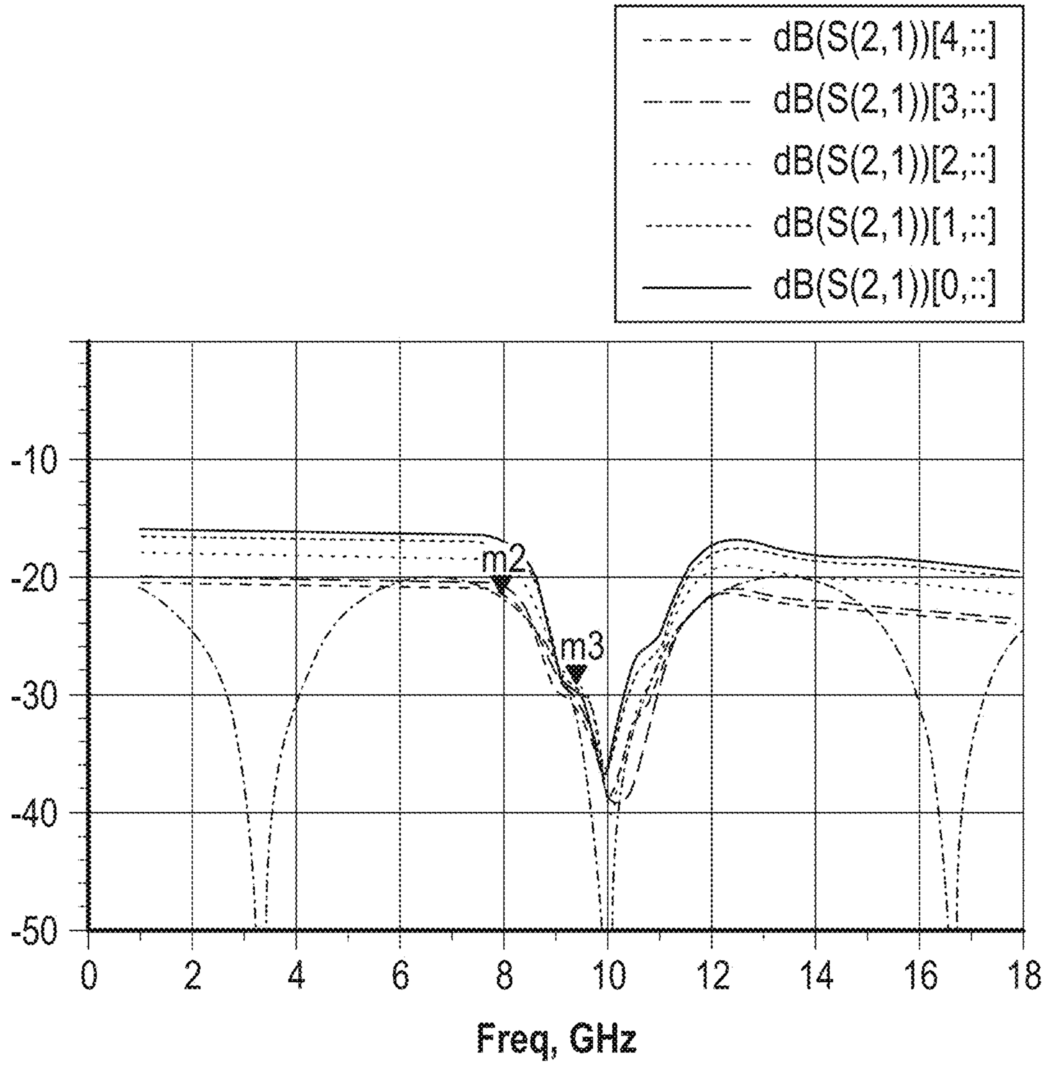
FIG. 7 illustrates a plot of exemplary bandstop filter characteristics, according to embodiments of this disclosure.

FIG. 7 illustrates plots of exemplary values of the disclosed bandstop filter (e.g., bandstop filter 200) attenuation, compared to bandstop filters without the disclosed bandpass filters at frequencies from 2 to 18 GHz. As illustrated, the bandstop filter is tuned to reject components around 10 GHz.

The plots show that without the bandpass filters, several off-target frequencies at 3 GHz and 17 GHz (e.g., harmonic nulls) are also attenuated. In comparison, the bandstop filter selectively rejects frequencies close to 10 GHz and maintains a baseline level of rejection at other frequencies. These results show that disclose bandstop filter achieves greater precision while maintaining strong attenuation of the tuned frequency.

In some embodiments, a system comprises a receiver configured to receive a signal comprising an unwanted frequency component, a tunable bandstop filter configured to attenuate an unwanted frequency component of an input signal to the tunable bandstop filter, the tunable bandstop filter comprising: a bandpass filter configured to output a bandpass signal by: attenuating frequencies of a signal input to the bandpass filter below a first frequency threshold, and attenuating frequencies of the signal input to the bandpass filter above a second frequency threshold, a delay element, and an amplitude adjustor, and one or more processors configured to attenuate the unwanted frequency component of the received signal by: determining, based on a delay of the bandpass filter and a frequency of the unwanted frequency component, delay to add by the delay element; causing the delay element to add the delay to a signal input to the delay element to generate a delayed signal; determining, based on an amplitude of the bandpass signal at the frequency of the unwanted frequency component, an amplitude adjustment; and causing the amplitude adjustor to modify, by the amplitude adjustment, the amplitude of a signal input to the amplitude adjustor at the frequency of the unwanted frequency component to generate an amplitude-adjusted signal, where the unwanted frequency component of the received signal is attenuated based on the bandpass signal, the delayed signal, and the amplitude-adjusted signal.

In some embodiments, the delay element comprises a phase shifter.

In some embodiments, the delay to add is determined based on a 180-degree phase shift at the frequency of the unwanted frequency component.

In some embodiments, the delay to add comprises the 180-degree phase shift and the delay of the bandpass filter.

In some embodiments, the one or more processors are configured to determine a loss of the bandpass filter, and the amplitude adjustment is determined further based on the loss of the bandpass filter.

In some embodiments, the amplitude adjustor comprises an attenuator.

In some embodiments, the one or more processors are configured to determine the frequency of the unwanted frequency component.

In some embodiments, in accordance with the determined frequency, the one or more processors are configured to determine the first frequency threshold; and determine the second frequency threshold.

In some embodiments, the delay to add is determined based on the determined frequency.

In some embodiments, the system further comprises a second received operating at the frequency of the unwanted frequency component, and the frequency of the unwanted frequency component is determined based on the second receiver.

In some embodiments, the system further comprises a transmitted configured to transmit a second signal, and the second signal comprises the first signal comprising the unwanted frequency component.

In some embodiments, the tunable bandstop filter is configured to attenuate a second unwanted frequency component, the second frequency is attenuated based on a second bandpass signal, a second delayed signal, and a second amplitude-adjusted signal.

In some embodiments, the one or more processors are configured to determine a level of the attenuation of the unwanted frequency component, and one or more of the delay to add and the amplitude adjustment are determined further based on the level of the attenuation.

In some embodiments, the delay element comprises a programmable delay element.

In some embodiments, the bandpass filter comprises a programmable bandpass filter.

In some embodiments, the attenuating the unwanted frequency component based on the bandpass signal, the delayed signal, and the amplitude-adjusted signal comprises: generating a delayed amplitude-adjusted signal based on the delayed signal and the amplitude-adjusted signal; and combining the bandpass signal and the delayed amplitude-adjusted signal.

In some embodiments, a frequency of the received signal is 2-18 GHz.

In some embodiments, a method for attenuating an unwanted frequency component comprises receiving a signal comprising the unwanted frequency component; outputting a bandpass signal by: attenuating frequencies of a first signal to the bandpass filter below a first frequency threshold, and attenuating frequencies of the first signal to the bandpass filter above a second frequency threshold; determining, based on a delay associated with the outputting of the bandpass signal and a frequency of the unwanted frequency component, a delay to add to a second signal; adding the delay to the second signal to generate a delayed signal; determining, based on an amplitude of the bandpass signal at the frequency of the unwanted frequency component, an amplitude adjustment; modifying, by the amplitude adjustment, the amplitude of a third signal to generate an amplitude-adjusted signal; and attenuating the frequency of the unwanted frequency component based on the bandpass signal, delayed signal, and amplitude-adjusted signal.

In some embodiments, the method further comprises determining the frequency of the unwanted frequency component.

In some embodiments, one or more of the first frequency threshold, the second frequency threshold, the delay to add, and the amplitude adjustment are determined based on the determined frequency of the unwanted frequency component.

In some embodiments, the method comprises one or more steps described with respect to the above system.

Although "electrically coupled" and "coupled" are used to describe the electrical connections between two electronic components or elements in this disclosure, it is understood that the electrical connections do not necessarily need direct connection between the terminals of the components or elements being coupled together. For example, electrical routing connects between the terminals of the components or elements being electrically coupled together. In another example, a closed (conducting or an "on") switch is connected between the terminals of the components being coupled together. In yet another example, additional elements connect between the terminals of the components being coupled together without affecting the characteristics of the circuit. For example, buffers, amplifiers, and passive circuit elements can be added between components or elements being coupled together without affecting the characteristics of the disclosed circuits and departing from the scope of this disclosure.

Those skilled in the art will recognize that the systems described herein are representative, and deviations from the explicitly disclosed embodiments are within the scope of the disclosure.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A system comprising:
- a receiver configured to receive a signal comprising an unwanted frequency component;
- a tunable bandstop filter configured to attenuate an unwanted frequency component of an input signal to the tunable bandstop filter, the tunable bandstop filter comprising:
  - a bandpass filter configured to output a bandpass signal by:
    - attenuating frequencies of a signal input to the bandpass filter below a first frequency threshold, and
    - attenuating frequencies of the signal input to the bandpass filter above a second frequency threshold,
  - a delay element, and
  - an amplitude adjustor; and
- one or more processors configured to attenuate the unwanted frequency component of the received signal by:
  - determining, based on a delay of the bandpass filter and a frequency of the unwanted frequency component, delay to add by the delay element;
  - causing the delay element to add the delay to a signal input to the delay element to generate a delayed signal;
  - determining, based on an amplitude of the bandpass signal at the frequency of the unwanted frequency component, an amplitude adjustment; and
  - causing the amplitude adjustor to modify, by the amplitude adjustment, the amplitude of a signal input to the amplitude adjustor at the frequency of the unwanted frequency component to generate an amplitude-adjusted signal,
- wherein the unwanted frequency component of the received signal is attenuated based on the bandpass signal, the delayed signal, and the amplitude-adjusted signal.

2. The system of claim 1, wherein the delay element comprises a phase shifter.

3. The system of claim 1, wherein the delay to add is determined based on a 180-degree phase shift at the frequency of the unwanted frequency component.

4. The system of claim 3, wherein the delay to add comprises the 180-degree phase shift and the delay of the bandpass filter.

5. The system of claim 1, wherein:
- the one or more processors are configured to determine a loss of the bandpass filter, and
- the amplitude adjustment is determined further based on the loss of the bandpass filter.

6. The system of claim 1, wherein the amplitude adjustor comprises an attenuator.

7. The system of claim 1, wherein the one or more processors are configured to determine the frequency of the unwanted frequency component.

8. The system of claim 7, wherein in accordance with the determined frequency, the one or more processors are configured to:
- determine the first frequency threshold; and
- determine the second frequency threshold.

9. The system of claim 7, wherein the delay to add is determined based on the determined frequency.

10. The system of claim 1, further comprising a second receiver operating at the frequency of the unwanted frequency component, wherein the frequency of the unwanted frequency component is determined based on the second receiver.

11. The system of claim 1, further comprising a transmitter configured to transmit a second signal, wherein the second signal comprises the first signal comprising the unwanted frequency component.

12. The system of claim 1, wherein:
- the tunable bandstop filter is configured to attenuate a second unwanted frequency component,
- the second frequency is attenuated based on a second bandpass signal, a second delayed signal, and a second amplitude-adjusted signal.

13. The system of claim 1, wherein the one or more processors are configured to determine a level of the attenuation of the unwanted frequency component, wherein one or more of the delay to add and the amplitude adjustment are determined further based on the level of the attenuation.

14. The system of claim 1, wherein the delay element comprises a programmable delay element.

15. The system of claim 1, wherein the bandpass filter comprises a programmable bandpass filter.

16. The system of claim 1, wherein the attenuating the unwanted frequency component based on the bandpass signal, the delayed signal, and the amplitude-adjusted signal comprises:
- generating a delayed amplitude-adjusted signal based on the delayed signal and the amplitude-adjusted signal; and
- combining the bandpass signal and the delayed amplitude-adjusted signal.

17. The system of claim 1, wherein a frequency of the received signal is 2-18 GHz.

18. A method for attenuating an unwanted frequency component, comprising:
- receiving a signal comprising the unwanted frequency component;
- outputting a bandpass signal by:
  - attenuating frequencies of a first signal to the bandpass filter below a first frequency threshold, and
  - attenuating frequencies of the first signal to the bandpass filter above a second frequency threshold;
- determining, based on a delay associated with the outputting of the bandpass signal and a frequency of the unwanted frequency component, a delay to add to a second signal;
- adding the delay to the second signal to generate a delayed signal;
- determining, based on an amplitude of the bandpass signal at the frequency of the unwanted frequency component, an amplitude adjustment;
- modifying, by the amplitude adjustment, the amplitude of a third signal to generate an amplitude-adjusted signal; and
- attenuating the frequency of the unwanted frequency component based on the bandpass signal, delayed signal, and amplitude-adjusted signal.

19. The method of claim 18, further comprising determining the frequency of the unwanted frequency component.

20. The method of claim 19, wherein one or more of the first frequency threshold, the second frequency threshold, the delay to add, and the amplitude adjustment are determined based on the determined frequency of the unwanted frequency component.

* * * * *